April 30, 1940.     J. W. WATSON     2,199,145
MOTION CONTROLLING MECHANISM
Filed Sept. 15, 1938     5 Sheets-Sheet 1
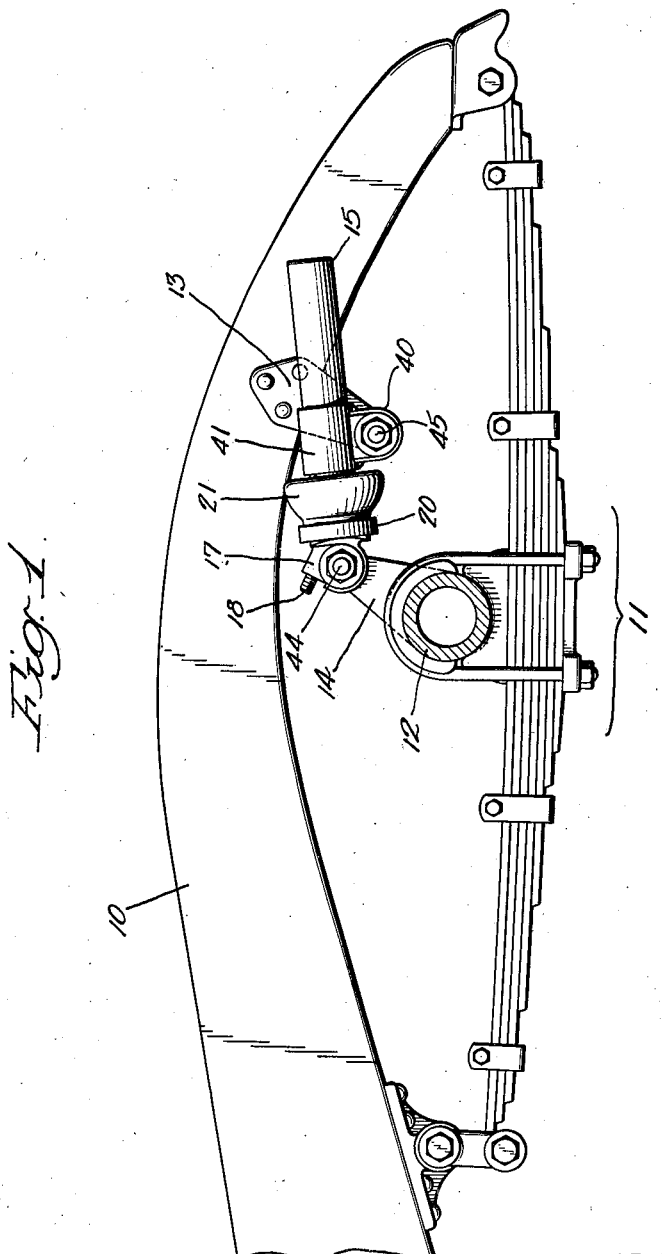
Inventor:-
John Warren Watson
by his Attorneys
Howson & Howson

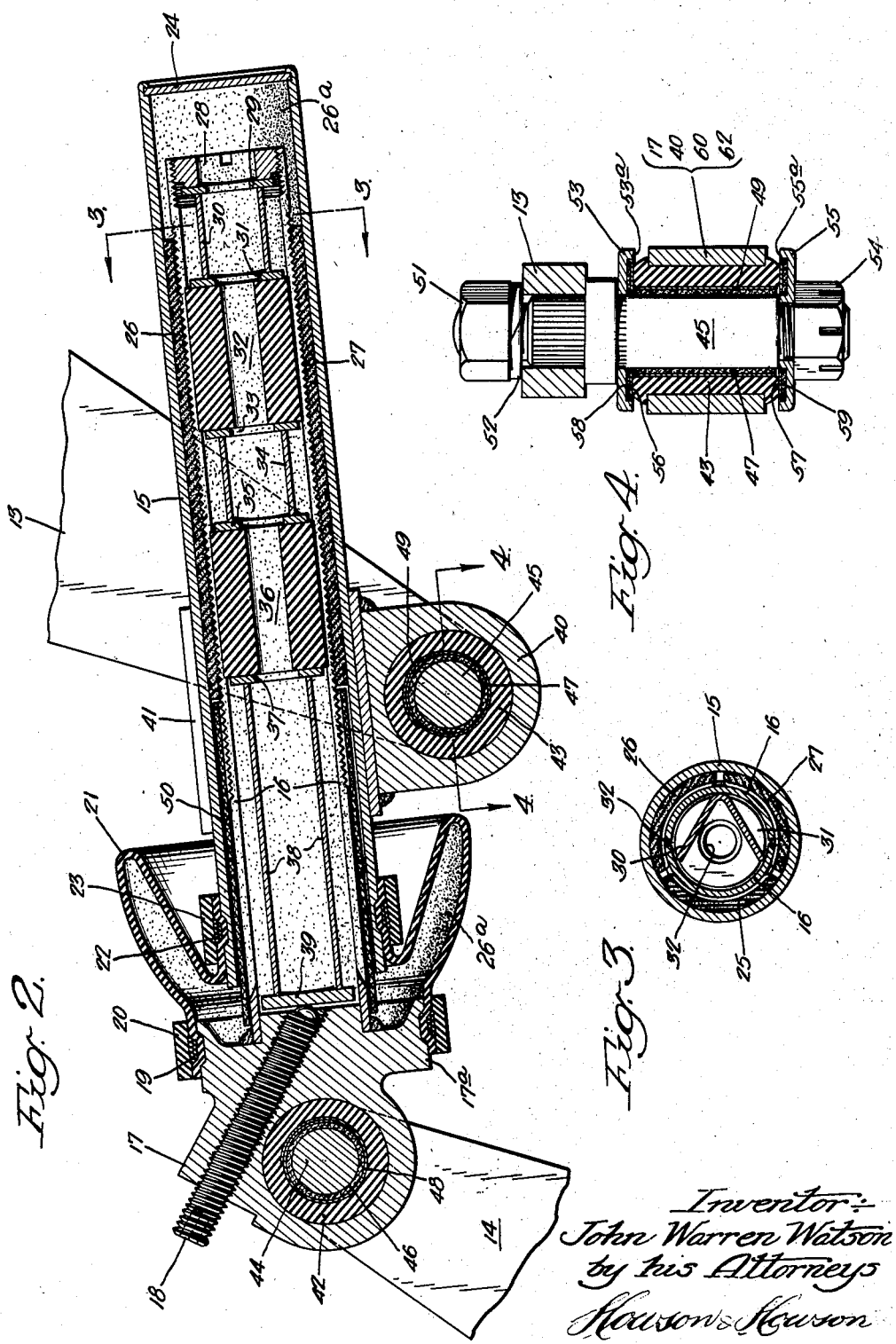

April 30, 1940.  J. W. WATSON  2,199,145
MOTION CONTROLLING MECHANISM
Filed Sept. 15, 1938  5 Sheets-Sheet 3
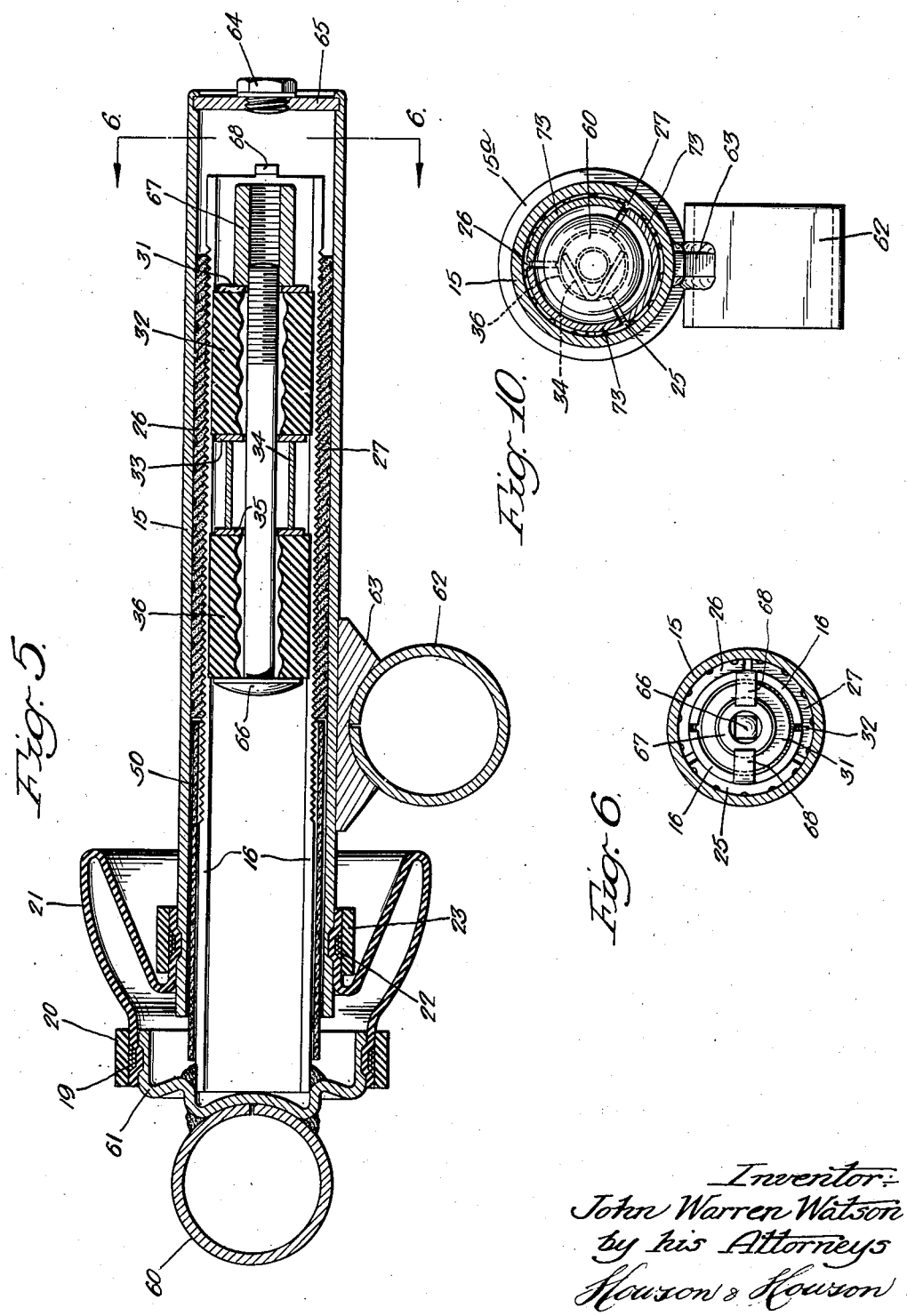
Inventor:
John Warren Watson
by his Attorneys
Howson & Howson

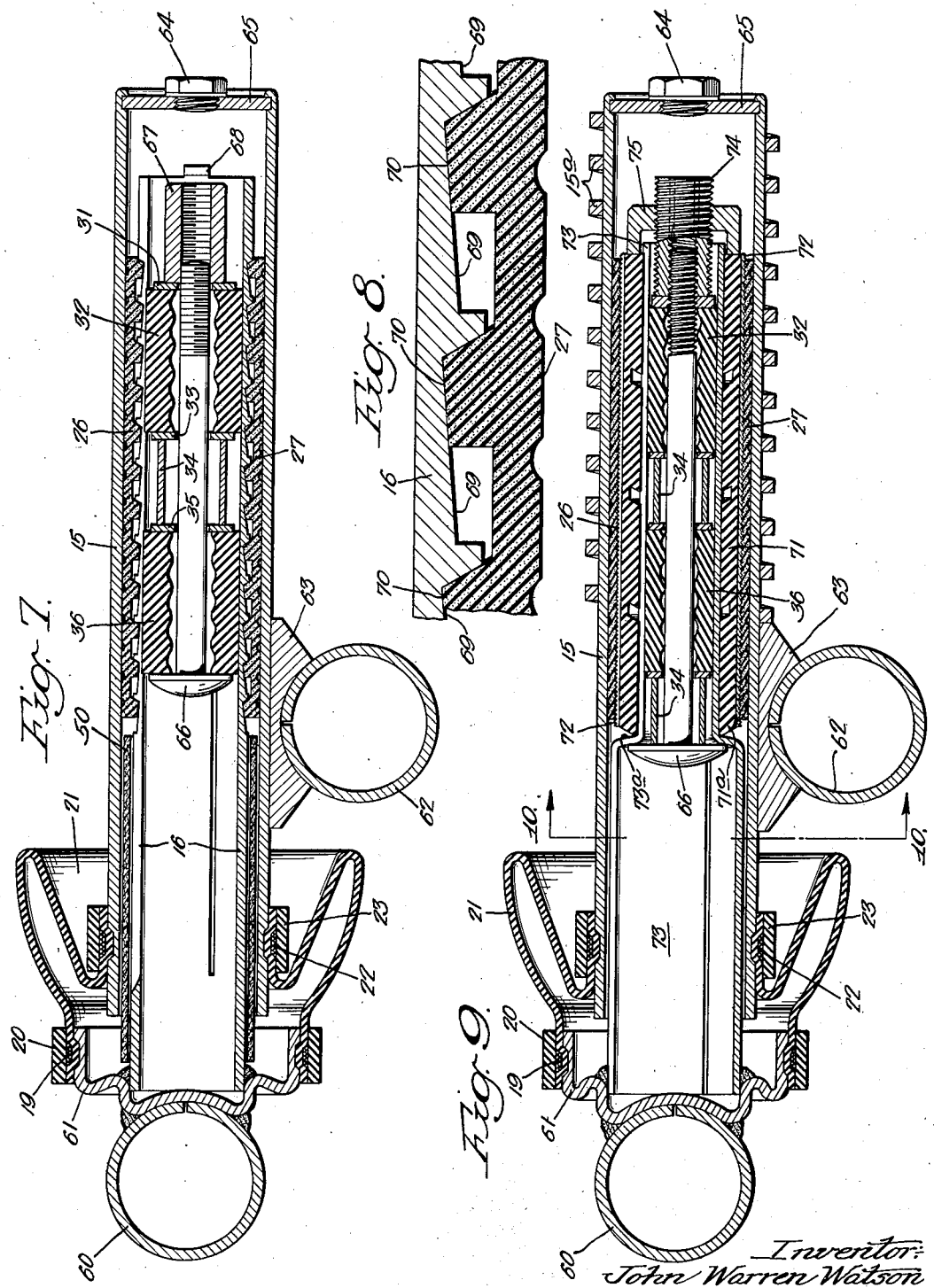

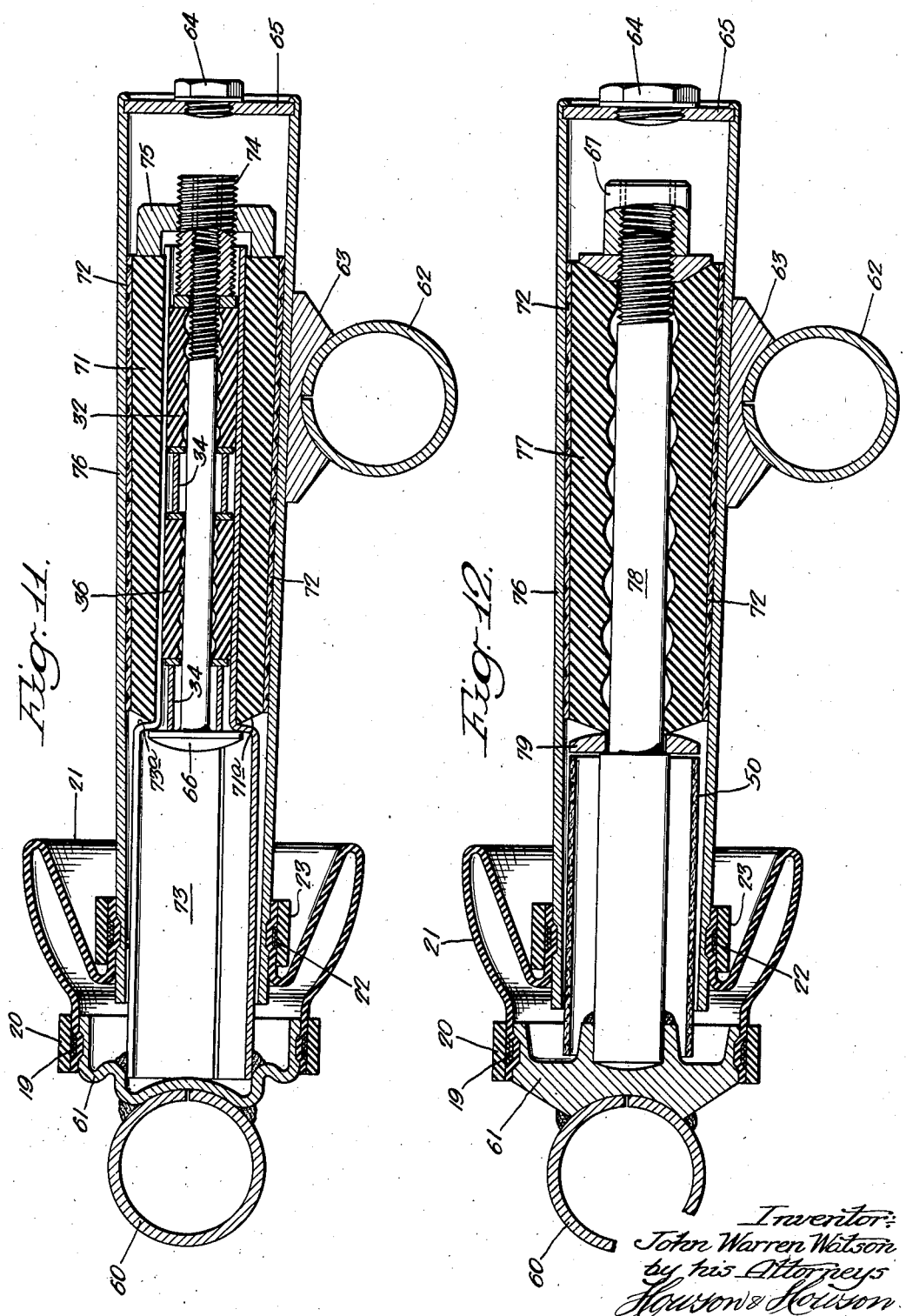

Patented Apr. 30, 1940

2,199,145

UNITED STATES PATENT OFFICE 2,199,145

MOTION CONTROLLING MECHANISM

John Warren Watson, Wayne, Pa., assignor to John Warren Watson Company, Philadelphia, Pa., a corporation of Pennsylvania Application September 15, 1938, Serial No. 230,157

35 Claims. (Cl. 188—129)

This invention relates to mechanisms for controlling movements between relatively movable elements, and in particular to controlling the relative movements occurring between the sprung and unsprung portions of a vehicle. These relative movements between the sprung and unsprung portions of a vehicle are caused by ever-varying forces, ranging from mild centrifugal forces causing mild swaying movements of the vehicle body; nose-diving or nose-lifting movements caused by momentary shifting of the body weight fore or aft, coincident respectively with the application of brakes or the rapid acceleration of the vehicle in a forward direction; and through the whole range of varying spring-recoil forces, up to the most violent of these forces which follows complete compression of the vehicle springs. Among other relative movements between the sprung and unsprung portions of a vehicle which are controlled by the mechanisms herewith, are the axle "wrapping" movements caused by the sudden application of brakes, and also, in a reverse direction, by the sudden application of power to the driving axle. Axle "wrapping" may also be caused by wheel accelerations followed by abrupt wheel "stops", if the power is on during wheel dancing on washboard roads.

A particular object of my invention is to provide a control mechanism which, (instead of having to rely upon speed of relative movement between its parts before producing any substantial resistance to their relative movement—too late for providing correct control) is ready-set with resistance to instantly "nip in the bud" and hold under control any degree of force, mild to heavy, which without such instant application of resistance would result in undesirable relative movements between the elements to which the parts of the mechanism are respectively attached.

A further object of my invention is to provide a control mechanism which is simple in construction and operation and which, when mounted between the sprung and unsprung portions of a vehicle, provides varying degrees of resistance for opposing and controlling varying forces.

A further object of my invention is to provide a control mechanism which will oppose varying degrees of force with varying degrees of resistance, automatically and without resort to intricate and delicate parts.

A further object of my invention is to provide an energy-dissipating control mechanism for mounting in such a manner, with relation to the sprung and unsprung portions of a vehicle, as will provide adequate resistance to prevent undesirable body sway, undesirable nose-diving and nose-lifting, and undesirable axle wrapping.

A further object of my invention is to provide a control mechanism as above which may be manually and readily adjusted to properly oppose the varying forces to be controlled in vehicles of different weights and different designs of suspension springing, and/or different personal likings.

A further object of my invention is to provide a control mechanism which will resist wear indefinitely and which will therefore retain any given adjustment.

A further object of my invention is to provide a control mechanism which is tight against the entry of water, dirt and dust to the working parts within.

A further object of my invention is to provide a control mechanism for producing resistance and dissipating energy and which performs its work with utter smoothness of action and with utter silence, at all times, and under any working conditions.

A further object of my invention is to provide a control mechanism as above which will readily accommodate itself to any possible position or change of position between the sprung and unsprung portions of a vehicle to which it is attached.

A further and very particular object of my invention, as shown, by way of example, by several of the modified forms herein, is to provide a control mechanism which, when mounted between the sprung and unsprung portions of a vehicle, will automatically offer a lesser amount of resistance during the compression of the vehicle spring from its normal standing position than during the return or recoil of the spring from a compressed position back to its normal standing position.

A further and equally particular object of my invention is to provide a control mechanism, as is also shown by these same modified forms, which, when mounted between the sprung and unsprung portions of a vehicle, will automatically offer a lesser amount of resistance as the vehicle spring is expanding away from its normal standing position than when it is returning to its normal standing position from an expanded position.

A further and also equally particular object of my invention is to provide a control mechanism which, when mounted between the sprung and unsprung portions of a vehicle, will automatically combine, in the one mechanism, the resistance differentials set forth in the two, next above, objects.

Another and very particular object of the invention is to provide a mechanism embodying all of the above qualities which, because of its complete simplicity, lends itself to production at low cost.

A further and very particular object of the invention is to provide features of design, as introduced for example in the several embodiments herewith, which may be brought together in the construction of a mechanism to give any desirable sequence or relationship of control resistance to satisfactorily meet the multitude of varying forces and combinations of forces which are constantly active between the sprung and unsprung portions of a vehicle to disturb the adherence of the wheels to the road or to disturb the flat, horizontal travel of the body.

Other objects and advantages of the invention will become more clear from the description which follows in connection with the various forms and modifications of the invention illustrated in the attached drawings, wherein:

Figure 1 is a side elevational view of a portion of a vehicle showing the improved control mechanism and its improved mounting with relation to the sprung and unsprung portions of a vehicle, in this instance being brackets extending upward and downward, respectively, from the car axle and the car frame.

Fig. 2 is a vertical longitudinal sectional view of one form of the improved control mechanism. This view shows fragmentary elevational views of the brackets which extend from the car frame and car axle and also sectional views of the pivot members connecting these brckets with the mechanism.

Fig. 3 is a sectional view taken on line 3—3 of Fig. 2.

Fig. 4 is a horizontal sectional view on line 4—4 of Fig. 2, showing a preferred form of flexible pivot structure for connecting relatively movable parts of the control mechanisms shown herewith, with the frame and axle brackets respectively.

Fig. 5 is a vertical longitudinal sectional view of a simplified form of the mechanism shown in Fig. 2.

Fig. 6 is a sectional view taken on line 6—6 of Fig. 5.

Fig. 7 is a vertical longitudinal sectional view similar to Fig. 5, but showing a modified form of the invention.

Fig. 8 is an enlarged vertical longitudinal sectional view of a portion of the sectional view shown in Fig. 6.

Fig. 9 is a vertical longitudinal sectional view of a still further modified form of the invention.

Fig. 10 is a sectional view taken on line 10—10 of Fig. 9.

Fig. 11 is a vertical longitudinal sectional view of a still further modified form of the invention.

Fig. 12 is a vertical longitudinal sectional view of a still further modified and somewhat simplified form of the invention.

Referring to Figure 1 of the drawings, there is shown a fragmentary view of one side of a vehicle having a frame member 10, to which is attached, in the customary manner, a spring 11, and to which in turn is attached, in the customary manner, axle 12. Brackets 13 and 14 are securely attached to frame member 10 and axle 12 respectively, and relatively movable parts of the control mechanism are pivotally and flexibly connected respectively to the bracket members. Different control characterictics to relative movements of the sprung and unsprung portions of the vehicle may be obtained by varying the vertical relationship between the pivot points. It has been found, for example, in the case of those vehicles on which installations have been made that better results are obtained when the sprung and unsprung pivots are not positioned relatively on a dead horizontal line, but when the sprung pivot is somewhat below a line extending horizontally from the unsprung pivot. Excellent results have been obtained with the sprung pivot one inch below this line (front end of car) and one and one-half inches below this line (rear end of car), the above relative pivot positions being determined with the car at rest on level pavement and with no passenger load. Terms such as "substantially horizontal" and "substantially at right angles to the relative vertical movements of the pivot points" should be understood to include any relative position of the pivot points which places the "sprung" pivot on a line horizontal to, or below, the "unsprung" pivot, this being in contrast to the so-called vertical method of mounting which places the "sprung" pivot above the "unsprung" pivot, these relative positionments of the pivot points, as above stated, being determined or fixed when the car is in its normal standing position, without passenger load. As concerns control against side sway, better results are obtained by placing the pivot points relatively on a line more nearly horizontal. This is because in this position a tighter adjustment must be carried in order to come somewhere near satisfying the demand for up and down or ride control.

In the form of the invention shown in Figure 2, the improved control mechanism includes a cylindrical casing 15 and a coacting longitudinally split tubular structure 16. To one end of this split tubular structure is attached, by welding for example, a head member 17 which is threaded to receive an adjusting screw 18 and which has a collar portion 17a to which is snugly attached by means of rubber bands 19 and 20, or by other suitable clamping means, one end of boot member 21, which is made of rubber or other suitable flexible material. The other end of boot member 21 is similarly tightly sealed with relation to the open end of cylindrical casing 15 by means of rubber bands 22 and 23, or other suitable clamping means. Rubber bands 19 and 22 are preferably of small section and are stretched and wound tightly around and around the respective ends of boot member 21. Rubber bands 20 and 23 are of heavy section and are tightly stretched into position over the boot ends and serve to protect the bands of smaller section, and also, themselves, aid in holding the boot snugly in position with relation to head member 17 and cylindrical casing 15. Closure plug 24 is held in position with relation to casing member 15 by means of spinning over a portion of the latter, or by welding or by other suitable means. Carried by the inner tubular structure 16 are segmental members 25, 26 and 27, of any suitable friction material. These segments are securely held against longitudinal movement with relation to tubular member 16 by means of meshing threads or serrations formed on the outside surface of member 16 and the inside surface of the segmental members. Held within the inner tubular member 16 by means of threaded plug 28 will be found, in turn, washer 29, spacer 30, washer 31, cylindrically shaped member 32 of soft rubber or other suitable resilient material, washer 33, spacer 34, washer 35, a second cylindrically shaped resilient member 36, washer 37, spacer 38 and plug 39. Head member 40, by welding or other suitable means, is attached to a split sleeve 41 which surrounds and is sweated to the cylindrical casing 15. Head members 17 and 40 are bored out to receive the cylindrically formed cushioning members 42 and 43 of soft rubber or other suitable resilient material. Between these cushioning members 42 and 43 and stud members 44 and 45 are bushing members 46 and 47 of fibrous or other material which may be impregnated with or carry any suitable wear-resistant or lubricating material. Members 48 and 49 are contractible sleeves of sheet metal or other suitable material for protecting the bushings from any possible kneading actions which might be imparted thereto by flexing actions of the cushioning members. Stud members 44 and 45 respectively are securely attached to the brackets which extend from the vehicle axle and vehicle frame. The length of the stud, bushing, protective sleeve, and cushioning members is greater than the width of the head members, and thus protruding each side of the head members ample flexibility is provided in these joints for accommodating any twisting or misaligning actions which may normally occur between the vehicle frame and the vehicle axle during travel over the roads. Member 50 is a tube or sleeve of impregnated cardboard or of any other suitable material and loosely floats between the cylindrical casing 15 and the inner tubular member 16. The purpose of sleeve 50 is to fill the void between these two members sufficiently to prevent the boot member 21 from being sucked in and caught between them.

Referring to Figure 3 of the drawings, there is shown the cylindrical casing 15, the three segmental members 25, 26 and 27, the split tubular structure 16, and the resilient cylindrically-shaped member 32.

In the preferred form of pivotal connection shown in Figure 4, the member designated by numbers 17, 40, 60 and 62 represents the head members shown in Figure 2 and the modified forms of head members shown in Figures 5, 7, 9, 11 and 12. 13 is the frame bracket. 45 is the stud member which is secured to frame bracket 13 by nut 51 and lock washer 52. Secured against rotation with relation to stud member 45 by means of serrations formed on the latter, is a cupped washer 53. At the other end of stud member 45 and secured against rotation with relation thereto by means of jam nut 54 is a cupped washer 55. 43 is the cushioning member of soft rubber or other suitable flexible material. 49 is the contractible protective sleeve. 47 is the bushing member. Members 56 and 57 are protective washers, and members 58 and 59 are washer members of suitable self-lubricating bearing material. Thrust washer members 53 and 55, whether or not they are made to incorporate the cupped flanges 53a and 55a, should be of greater diameter than the wear-subjected washer members 58 and 59 in order to protect these latter members from flying gravel or damage through rough handling or from other outside agents. From the foregoing and from the vertical sectional view of this pivot structure shown in Figure 2, it will be apparent that this joint structure provides for free slippage and rotation to accommodate any required rotary movements between the control mechanism and the frame bracket. It will also be apparent that due to the inclusion of the cushioning member between the head member and the stud member, accommodation is made for any required angular movements between these members, thereby permitting changes of position between the car body and the car axle without placing undue strain on any parts of the mechanism, parts of the car, or the connecting brackets. Certain angular movements between stud members 44 and 45 (Figure 2) are freely permitted also by the fact that the two tubular-like members 15 and 16 are free to rotate with relation to each other. Adequate provision, such as is here provided, for complete flexibility of movement in any direction is absolutely essential in connection with this horizontal method of mounting a control mechanism between the sprung and unsprung portions of a vehicle.

The operation of the above and other forms of the mechanism illustrated and described herewith will be found beginning on page 6, line 27.

Figure 5 shows a form of the invention similar to that shown in Figure 2, but is simplified in the matter of the head structures and also as regards the adjustment means. In this embodiment, the head member, which is welded or otherwise secured to the inner or split tubular structure, is composed of a rolled-up tubular member 60 and the stamping 61, these two parts being held together by welding or other suitable means. 62 is a member like 60, which is welded to the saddle-piece 63, which in turn is welded along its sides to casing 15. The adjusting means is entirely enclosed within the mechanism and is reached by removing the plug 64, which is threaded into closure plug 65. 66 is a step type bolt, and 67 is an adjusting nut which is broached or otherwise formed, either before or after the threading operation, in such manner as to provide faces for the reception of a correspondingly formed adjusting tool. The sectional dimension of the adjusting tool and the hole in the closure plug should be kept as small as possible in order to prevent loss, while making adjustments, of a form of friction material to be later described. The rubber members 32 and 36 are preferably formed having an irregular inside diameter to provide spaces around the bolt into which the rubber may flow when being axially compressed. Otherwise, adjustments would tend toward being too critical. The bolt, spacer, washers, rubber members, and the nut, are assembled together before being placed within the split tube. The assembly is then pushed into place up to a proper predetermined point and the nut tightened to expand the rubbers radially and sufficiently to hold the assembly in place. Means may be provided if desired to prevent the nut from being too freely backed off from this position in order to insure that the assembly will not be loosened and move from its proper place. Suitable means for this purpose is shown by lugs or fingers 68 which may be formed as an integral part of tubular structure 16, these lugs, after proper positioning of the adjustment assembly, being bent over to cover the edge of nut 67.

Figure 7 shows a modification of the invention wherein is provided means to effect greater resistance to relative movements of the tubular structures in one direction than in the other direction. As the parts are here arranged, the greater resistance is provided during relative movements of the structures into or toward each other. This is accomplished by forming around the outer surface of the inner tubular structure 16 a plurality of tapered annular grooves 69 and a plurality of tapered annular projections 70 on the inner surfaces of the segments 25, 26 and 27. The grooves 69 are wider than the projections 70, thus permitting a predetermined relative longitudinal movement between the segments 25, 26 and 27 and the inner tubular structure 16 as the inner and outer tubular structures are moved, relatively, in and out. When being moved inwardly, the angle or taper of the grooves and projections will cause structure 16 to be slightly contracted and thus cause a further compression of the rubber members 32 and 36 and, in turn, greater pressure between segments 25, 26 and 27 and outer casing 15 which will result in greater resistance to their relative movement in that, the inwardly, direction. The reverse, or lesser pressure and resistance, will result in their reverse or outward movement.

Figure 8 being an enlarged sectional view illustrating this tapered and sliding arrangement between the inner tubular structure and the segments will serve to make more clear the effect of this relative back and forth movement between these parts. To secure any desired resistance differential between movements in opposite directions, is merely a matter of providing the required degree of angle or taper, the steeper the angle, the greater will become the differential. It is preferred, however, to keep the angle sufficiently flat to insure that complete movement of the projections 70 between the edges of grooves 69 shall take place at each reversal of movement during those temperatures which cause the lowest coefficient of friction between the segments 25, 26 and 27 and the outer casing 15. With complete movement between the edges taking place during times of lowest coefficient is assurance that these same complete movements will take place during times of any higher coefficient of friction. Thus, by keeping these angles sufficiently flat, there will be no change in the resistance differential resulting from any changes in temperature. To make the above matter more clear, it should be borne in mind that it is the resistance differential, i. e. the resistance difference between the two directions of movement of the coacting parts and not the general operation of the device, which is kept constant notwithstanding changes in the coefficient of friction. In other words, again, a high coefficient of friction would cause the mechanism to offer more resistance in both directions than would a low coefficient of friction, whereas the differential-producing means, in this instance the inclined planes, effects merely a pressure change during one direction of movement as compared to the other, and this pressure change, as has already been explained, takes place to a full predetermined extent, and hence to the same extent, regardless of coefficient changes within the intended operation and usage of the device. The resistance differential in connection with any given angle or taper may be varied to suit requirements by varying the durometer of expansion rubbers 32 and 36. By this pressure and resistance differential arrangement, in conjunction with the horizontal mounting of the mechanism, it will be seen that there is provided a lesser resistance to relative movements between the sprung and unsprung portions of the vehicle as these portions are either approaching each other or going away from each other from their normal relative position than when these portions are either approaching each other or going away from each other toward their normal relative position. In other words, as applied to vehicles currently in vogue, in which the frame or body support is sprung above the axle, when the axle and frame are being forced together from their normal relative position toward a "bottoming" position, or when the axle is falling away from the frame from their normal relative position to an extended position, the resistance to relative movement is less than when the frame and axle recoil away from the "bottomed" position toward their normal position or when the body and axle plunge together from an extended position toward their normal position.

As an aid in the understanding of several of the claims where relative movements between the "sprung" and "unsprung" portions is referred to, it should be borne in mind that the body and axle, and not necessarily the pivot points, are the portions referred to.

Figure 9 shows a further modified form of the invention producing, by other means, a resistance differential similar to that provided for by the modification shown in Figures 7 and 8. In the present embodiment, this differential action is brought about by action against sleeve member 71 which may be constructed of soft rubber or other suitably resilient material. This member 71 may be in the form of a continuous sleeve or tube, or may be made up of two or more segments. Attached to the outside of the sleeve or sleeve segments, as for example by vulcanization, are segments 72 of brass or other suitable material, the outer surfaces of which being suitably grooved or otherwise formed as is the inner tubular structure 16 described in connection with the embodiment shown in Figure 2 to hold in place the segments 25, 26 and 27. The inner tubular structure 73, which is split longitudinally, is provided with a shoulder 73a. The resilient sleeve member 71, or its component segments, is held snugly against shoulder 73a by means of the step type bolt 66, the adjusting nut 74, and the superimposed nut 75. The adjusting nut 74 as far as its internal arrangement is concerned is similar to adjusting nut 67 shown in Figure 5. Adjusting nut 74 is provided with threads on its outside diameter as well as on its inside diameter, there being the same number of threads per inch in both cases. After assembling the step type bolt, washers, spacers, resilient expansion members and the nut 74 within the tubular member 73, the nut 75 is screwed up against the resilient sleeve member to hold it firmly in position. The inner and outer threads on nut 74 consisting of the same number per inch permits adjustment of the expansion rubbers 32 and 36 by turning nut 74 without altering the pressure between sleeve 71 and nut 75, the friction between this nut and the soft rubber sleeve being sufficient to prevent the nut from turning with nut 74. The resistance differential in this embodiment of the invention is brought about by the well known method of rubber compression and expansion which will result when shoulder 73a is pushed against the protruding end 71a of sleeve 71. When the inner tubular member 73 is pulled in the opposite direction, no such compression and expansion takes place, and hence a pressure and resistance differential, similar to that described in connection with embodiment shown in Figure 7, is provided. By varying the contour of the shoulder 73a or the protruding end 71a or both of them, or by varying the durometer of the sleeve member 71 and/or the expansion rubbers 32 and/or 36, any required resistance differential may be obtained. Protective means against flying gravel, etc., in the form of a coiled wire 15a, or otherwise, may be provided around the casing 15, such structure also serving in the matter of heat radiation.

Figure 11 shows a modified form of the invention similar to that shown in Figures 9 and 10 except for the omission of the segments 25, 26 and 27 and the fact that the outer tubular structure or casing 76 is slightly tapered, its diameter progressively decreasing toward its open end. Also, because of the control variable, produced by this tapering of the outer casing, it becomes possible to increase the distance between the points of connection with the sprung and unsprung portions of the vehicle without sacrificing the control variable normally produced by a close relationship of the pivot points. Having less overhang of the outer casing beyond its head member or pivot point lessens the chance of interference between the swinging outer end of the casing and other parts of the vehicle, and hence this arrangement may be found advantageous in making possible certain installations. Also by increasing the distance between the two pivot points, their angular action is reduced, thus reducing their wear. In a construction such as is here shown, wherein the segments 25, 26 and 27 are omitted, the brass segments 72 are provided, over their outside surface, with suitable angular or crisscross grooving, to provide for the proper distribution, between these segments and the outer casing, of a form of friction material to be later described. Increasing the distance between the pivot points decreases the control variable produced by the working of the mechanism during relative movements between the sprung and unsprung portions of the vehicle. The tapering of the casing, however, may be made such as to offset this decrease and, by sufficient tapering, may be made to more than offset the decrease and produce any amount of increase of control variable. Thus by varying the distance between the pivot points and by varying the degree of taper in the casing, or by varying the durometer of any or all of the rubber members, any ratio of control variable may be accurately obtained.

Figure 12 shows a still further and somewhat simplified modification of the invention wherein the rubber sleeve 77 which acts similarly to sleeve 71, Figures 9 and 11, in providing a resistance differential, also acts in the capacity of providing the adjustment means when it is compressed or released axially by turning the adjusting nut 67. In this embodiment, the inner tubular structure shown in the previous embodiment is displaced by the rod 78. Washer 79 serves the same purpose as shoulder 73a in the embodiment shown in Figure 11. In this present embodiment, tube 50 is included. The purpose of this tube is described in connection with the embodiment shown in Figure 2.

In the embodiments shown in Figures 9, 11 and 12, by suitable contouring to limit the extent of compression of sleeves 71 or 77 to that which would occur when the coefficient of friction is, due to temperature, at its lowest, then any higher coefficient of friction can cause no greater compression of these sleeves, and hence no greater resistance to movement can be produced. Thus, again, as in the embodiment shown in Figure 7, temperature changes can be made to have no effect on the resistance differential.

The tapered outer casing shown in connection with Figures 11 and 12 may be substituted for the straight casing shown in the other embodiments if desired in order to augment the control variable normally provided by the horizontal mounting arrangement. Or the straight casings may be substituted for the tapered casings, in Figures 11 and 12.

Segments 25, 26 and 27 shown in several of the embodiments of the invention are preferably made of a material whereof the static and dynamic coefficients of friction are balanced to a degree which prevents "stick" at the start of movements, and hence produces no spasmodic actions, vibrations or noises. One such material is described in U. S. Patent No. 1,845,858 granted to Watson and Redfield. Many forms and modifications of such material for satisfying a variety of frictional requirements and duties have been developed, manufactured and marketed by the John Warren Watson Company. These segments may be used alone in any of the embodiments shown, or they may be used in conjunction with the novel form of friction material, yet to be described, employed in connection with the grooved brass segments shown in Figures 11 and 12. If so used, and to take full advantage of the novel form of friction material, these segments 25, 26 and 27 should be provided over their outside surfaces with suitable grooving similar to that called for on the outside surfaces of segments 72.

Also, if desired, segments 25, 26 and 27 may be dispensed with and copper or other metallic segments with properly grooved faces may be used in their place against the wall of the outer casing in any of the embodiments of the invention shown herein. In the embodiment shown in Figure 9, brass segments with grooved faces would be held to rubber sleeve 71 as are the present brass segments, by vulcanization. In the embodiment shown in Figures 7 and 8 segments of copper, brass or other suitable metal would be pressed or die cast with integral tapered projections. In the embodiments shown in Figures 2, 3, 5 and 6, these metallic segments would be held with relation to the inner tubular structure by the same grooved means as those referred to, or in these embodiments, the segments might be entirely dispensed with by making the split tubular structure of brass or of steel plated with copper, brass or other suitable metal, suitable grooving of course being provided for the proper distribution of the new form of friction material.

The inner tubular structure shown in any of the embodiments may be made by slitting a tube longitudinally, at one or more points, or by assembling, with the head member, two or more preformed segments.

The novel form of friction material, above referred to, consists of a suitable friction material in powdered form, indicated in Fig. 2 by the reference numeral 26a, so finely divided as to float in air and readily enter and form, and constantly maintain, a film between two relatively movable members notwithstanding the maintenance of high pressures therebetween. Thus, instead of starting off with a friction member having form and whose form would be gradually reduced to powder by usage, the novel method of frictioning, herewith, provides for starting off with friction material having no form, and hence incapable of being detrimentally changed by usage. In other words, by the employment of this novel form of frictioning, a friction mechanism may be, and here is, provided which cannot be worn out by usage because it is already worn out when its usage starts. Of very great importance in connection with the use of this novel form of frictioning is the fact that, without wear, no compensating readjustments are required to maintain an initial pressure and resistance setting.

A very satisfactory friction material for this novel frictioning method has been found in calcium stearate and other insoluble soaps of fatty acids. In connection with this material for lubricated frictional duty, reference may be made to U. S. Patent No. 1,845,096, granted to Robert F. Nowalk.

I have found that approximately six grammes of calcium stearate is a satisfactory quantity to be used in any of the several embodiments of my invention illustrated herein. The tightly sealed, flexible boot members prevent the escape of the powder. The working of the mechanism, back and forth, sets up a strong back and forth flow of friction-laden air from one end of the mechanism to the other, thus keeping the coacting pressure surfaces constantly bathed and filmed and protected from one another.

In the embodiments of the invention shown in Figures 2 and 5, the mechanism produces a constant and equal resistance during relative movement of its parts in either direction. The progressively varying resistance to relative movements between the sprung and unsprung portions of a vehicle is produced by the novel mounting of the mechanism with relation to the said vehicle portions whereby the mechanism is actuated by a progressively varying leverage, the leverage being greatest when these vehicle portions are approximately in their normal standing relationship and decreasing as the vehicle portions are caused to be relatively moved away from normal in any direction, the leverage then increasing progressively as the vehicle portions are caused to return to their normal standing relationship. To state the above in another way, it will be seen that the rate of travel between the coacting parts of the instrument, and hence the amount of work done per inch of relative movement between the "sprung" and "unsprung" portions of the vehicle, becomes increasingly greater as the frame and axle are moving away from their relative normal position, and becomes increasingly less as the frame and axle are returning to their normal relative position.

In the modification shown in Figure 7, the resistance is constant during relative movements of the parts of the mechanism in either direction, but is greater in one direction than in the other. In other words, provision is here made for causing a resistance differential during relative movements of the parts in opposite directions whereby, in this instance, the greater resistance is produced when the relatively movable parts of the mechanism are being relatively moved inwardly.

A resistance differential to opposite movements is also provided in the modifications shown in Figures 9, 11 and 12, but, in addition, according to the contour of the sleeve ends and/or the abutments which drive them, a varying resistance, in place of a constant resistance, may be produced during movements in either direction, the variable being brought about by each increase or decrease of force causing such movements.

In the embodiments shown in Figures 11 and 12 provision is also made, by the taper of the casing, for producing a progressively varying resistance of a positive nature which increases as the leverage factor, resulting from the novel mounting arrangement, decreases, thus accentuating the variable characteristic as the vehicle portions are caused to be relatively moved away from or toward their normal relative standing position.

By referring to the several forms of the invention above illustrated and described, it will be apparent that by varying the distance relationships of the pivot points horizontally or vertically, by varying angles or tapers, by varying durometers, by varying contours and by varying manual adjustments, a set of control characteristics may be produced to satisfactorily meet almost any imaginable control requirements in the matter of variable ratios of control as well as in the matter of control differentials.

Obviously there may be considerable modification in structural detail and in the forms and relative arrangements of the various elements without departure from the essential principles of the invention as defined in the appended claims.

I claim:

1. In mechanism for controlling relative movements between the sprung and unsprung portions of a vehicle, a combination of parts and their positionment with relation to said vehicle portions which will provide progressively increasing resistance to relative movements of said vehicle portions as they are caused to move away from their normal relative standing position, said combination comprising two relatively movable structures spaced from each other by friction material and respectively held in pivotal relation with said vehicle portions, said pivot points, when the vehicle is at rest and in its normal standing position, being on a line substantially at right angles to the line of relative travel of said pivot points when the vehicle is in motion and the sprung and unsprung portions are alternately moving toward and away from each other, one of said relatively movable structures being deflectable, and means comprising a resilient member for deflecting said deflectable structure to cause pressure between it and said friction material and said other relatively movable structure.

2. In mechanism for controlling relative movements between the sprung and unsprung portions of a vehicle, a combination of parts and their positionment with relation to said vehicle portions which will provide progressively decreasing resistance to relative movements of said vehicle portions as they are caused to move toward their normal relative standing position, said combination comprising two relatively movable structures spaced from each other by friction material and respectively held in pivotal relation with said vehicle portions, said pivot points, when the vehicle is at rest and in its normal standing position, being on a line substantially at right angles to the line of relative travel of said pivot points when the vehicle is in motion and the sprung and unsprung portions are alternately moving toward and away from each other, one of said relatively movable structures being deflectable, and means comprising a resilient member for deflecting said deflectable structure to cause pressure between it and said friction material and said other relatively movable structure.

3. In mechanism for controlling relative movements between the sprung and unsprung portions of a vehicle, a combination of parts and their positionment with relation to said vehicle portions which will provide progressively increasing resistance to relative movements of said vehicle portions as they are caused to move away from their normal relative standing position, said combination comprising two relatively movable structures spaced from each other by friction material of sufficiently low static coefficient of friction to avoid "stick" at the start of relative movements between said structures to the extent that spasmodic actions, vibrations and noises are satisfactorily avoided, said relatively movable structures being respectively held in pivotal relation with said vehicle portions, said pivot points, when the vehicle is at rest and in its normal standing position, being on a line substantially at right angles to the line of relative travel of said pivot points when the vehicle is in motion and the sprung and unsprung portions are alternately moving toward and away from each other, one of said relatively movable structures being deflectable, and means comprising a resilient member for deflecting said deflectable structure to cause pressure between it and said friction material and said other relatively movable structure.

4. In mechanism for controlling relative movements between the sprung and unsprung portions of a vehicle, a combination of parts and their positionment with relation to said vehicle portions which will provide progressively decreasing resistance to relative movements of said vehicle portions as they are caused to move toward their normal relative standing position, said combination comprising two relatively movable structures spaced from each other by friction material of sufficiently low static coefficient of friction to avoid "stick" at the start of relative movements between said structures to the extent that spasmodic actions, vibrations and noises are satisfactorily avoided, said relatively movable structures being respectively held in pivotal relation with said vehicle portions, said pivot points, when the vehicle is at rest and in its normal standing position, being on a line substantially at right angles to the line of relative travel of said pivot points when the vehicle is in motion and the sprung and unsprung portions are alternately moving toward and away from each other, one of said relatively movable structures being deflectable, and means comprising a resilient member for deflecting said deflectable structure to cause pressure between it and said friction material and said other relatively movable structure.

5. In a direct acting piston type friction shock absorber, a tubular-like member and a coacting piston member, and means for causing pressure between said members, said members being directly provided with pivotal connections for holding them with relation to the sprung and unsprung portions respectively of a vehicle, said pivot points, when the vehicle is in its normal standing position, being, substantially, on a horizontal line, thus causing greater relative movement between the coacting members, per inch of relative movement between the sprung and unsprung portions of the vehicle, when the vehicle portions are relatively remote from their normal relative standing position than when they are relatively at their normal relative standing position.

6. In a friction shock absorber, two coacting frictionally opposed members, means for causing pressure between said members, and means for manually adjusting said pressure, said members being arranged for pivotal connection respectively to the sprung and unsprung portions of the vehicle, the points of said pivotal connections on the sprung and unsprung portions of the vehicle occurring in a plane substantially at right angles to the line of their relative travel.

7. In a shock absorber of the friction type, two relatively movable and frictionally opposed members, means for causing pressure between said members to effect frictional resistance to their relative movement, means for causing a resistance differential to their relative movement, and means for connecting said members respectively to the sprung and unsprung portions of a vehicle, said connecting means and said resistance differential means being so arranged as to provide lesser resistance to movement as the sprung and unsprung portions are either approaching each other or going away from each other from their normal relative position than when these portions are either approaching each other or going away from each other toward their normal relative position.

8. In a shock absorber of the friction type, two relatively movable and frictionally opposed members, means for causing pressure between said members to effect frictional resistance to their relative movement, means for causing a resistance differential to their relative movement in opposite directions, and means for connecting said members respectively to the sprung and unsprung portions of a vehicle, the parts being so arranged and positioned with relation to themselves and with relation to the above-mentioned portions of the vehicle as to provide greater resistance to their relative movement as the distance between the points of connection is being caused to decrease than when the distance between these points is being caused to increase.

9. In a double-acting piston type friction shock absorber, a tubular structure, a coacting piston structure, means for pivotally attaching one of said structures to the sprung portion of a vehicle and the other of said structures to the unsprung portion of the vehicle, means for causing pressure between said structures, and means for automatically varying said pressure to provide a greater pressure when the piston structure is caused to move inwardly with relation to the tubular structure than when the piston structure is caused to move outwardly with relation to the tubular structure.

10. In a shock absorber of the piston type, two frictionally opposed members, and means comprising friction material disposed between them, one of said two first-mentioned members being split longitudinally of its axis and being actuated by a resilient member to yield radially and thus exert pressure against said friction means and in turn against said other first-mentioned member, said two first-mentioned members being provided with pivotal connections for pivotally holding them with relation to the sprung and unsprung portions respectively of a vehicle, said pivot points, when the vehicle is at rest and in its normal standing position being arranged on a line substantially at right angles to the line of their relative travel and thus cause greater piston movement, per inch of relative movement between the sprung and unsprung portions of the vehicle, when these portions are relatively remote from their normal standing position than when they are relatively at their normal standing position.

11. In mechanism for controlling the varying forces and resultant relative movements between the sprung and unsprung portions of a vehicle, a tubular structure, a coacting piston structure, and means associated with one of said structures to provide continuous pressure between it and said other structure to cause resistance to their relative movement, flexible means for attaching said coacting structures respectively to said vehicle portions, the coacting structures being mounted in such manner with relation to said vehicle portions as will cause the mechanism to provide continuous but ever-varying resistance to the relative movements of said vehicle portions as the distance between them is made to change in any of several directions, the direction of said resistance variations, i. e., from high to low or from low to high, corresponding with the direction of the force variation.

12. In mechanism for controlling relative movements between the sprung and unsprung portions of a vehicle, a tubular structure, a coacting piston structure, frictional and pressure means to cause resistance to their relative movement, a weatherproof shield structure connecting said coacting structures for protecting the frictional parts from foreign abrasives, and flexible joint structures for connecting said coacting structures respectively with said vehicle portions, said joint structures permitting any required relative movements between the coacting structures and the vehicle portions.

13. In mechanism for controlling relative motion between the sprung and unsprung portions of a vehicle, a tubular structure, a coacting piston structure, means to cause resistance to their relative movement, a telescopic weather-proof boot structure sealed with relation to both of said coacting structures and having between its two ends a greater cross-section than that at said ends, and flexible joint structures for connecting said coacting structures respectively with said vehicle portions, said joint structures permitting any required relative movements between the coacting structures and the vehicle portions.

14. In mechanism for controlling the varying forces and resultant movements between the sprung and unsprung portions of a vehicle, a tubular structure, a coacting piston structure, means associated with one of said structures to provide continuous pressure between it and said other structure to cause resistance to their relative movement, and means for automatically increasing said continuous pressure as the coacting structures are caused to be relatively moved in one direction, flexible means for attaching said coacting structures respectively to said vehicle portions, the coacting structures being mounted in such manner with relation to said vehicle portions as will cause the mechanism to provide continuous but ever-varying resistance to the relative movements of said vehicle portions as the distance between them is made to change in any of several directions, the direction of said resistance variations, i. e., from high to low or from low to high, corresponding with the direction of the force variation.

15. In mechanism for controlling relative motion between the sprung and unsprung portions of a vehicle, a tubular structure, a coacting piston structure, means to cause resistance to their relative movement, two oscillating joint structures each having a member for attachment to one of said vehicle portions and each having a member attached to one of said coacting structures, the two above members of each joint structure being spaced apart by a flexible member to permit axial misalignments of said joint members, and each joint structure having a bushing member between its flexible member and one of its joint attachment members to permit rotary slip between said joint members.

16. In mechanism for controlling relative motion between the sprung and unsprung portions of a vehicle, a tubular structure, a coacting piston structure, means to cause resistance to their relative movement, two oscillating joint structures each having a member for attachment to one of said vehicle portions and each having a member attached to one of said coacting structures, the two above members of each joint structure being spaced apart by a flexible member to permit axial misalignments of said joint members, and each joint structure having a self-lubricating bushing member between its flexible member and one of its joint attachment members to permit rotary slip between said joint members.

17. In mechanism for controlling relative motion between the sprung and unsprung portions of a vehicle, a tubular structure, a coacting piston structure, means to cause resistance to their relative movement, a weather-proof boot structure sealed with relation to both of said coacting structures, two oscillating joint structures each having a member for attachment to one of said vehicle portions and each having a member attached to one of said coacting structures, the two above members of each joint structure being spaced apart by a flexible member to permit axial misalignments of said joint members, and each joint structure having a bushing member between its flexible member and one of its joint attachment members to permit rotary slip between said joint members.

18. In mechanism for controlling relative motion between the sprung and unsprung portions of a vehicle, a tubular structure, a coacting piston structure, means to cause resistance to their relative movement, a weather-proof boot structure sealed with relation to both of said coacting structures, two oscillating joint structures each having a member for attachment to one of said vehicle portions and each having a member attached to one of said coacting structures, the two above members of each joint structure being spaced apart by a flexible member to permit axial misalignment of said joint members, and each joint structure having a self-lubricating bushing member between its flexible member and one of its joint attachment members to permit rotary slip between said joint members.

19. In mechanism for controlling relative motion between the sprung and unsprung portions of a vehicle, a tubular structure, a coacting piston structure, means to cause resistance to their relative movement, said coacting structures each being provided with but a single pivot structure for pivotally connecting them respectively with said sprung and unsprung portions of the vehicle, one of said pivot structures being offset vertically from the longitudinal axis of the mechanism.

20. In mechanism for controlling relative motion between the sprung and unsprung portions of a vehicle, a tubular structure, a coacting piston structure, means to cause resistance to their relative movement, said coacting structures each being provided with means for pivotally connecting them respectively with said sprung and unsprung portions of the vehicle, said connecting means for the tubular structure being offset vertically from the longitudinal axis of said tubular structure.

21. In a double-acting piston type friction shock absorber, a tubular structure, a coacting piston structure, means for pivotally connecting one of said structures to the sprung portion of a vehicle and the other of said structures to the unsprung portion of the vehicle, means for causing pressure between said structures, and means to automatically increase said pressure as the piston structure is caused to move inwardly of the tubular structure, the degree of said pressure increase being unaffected by temperature changes.

22. In mechanism, two members designed for relative movement, a film of friction material between said members, means to cause pressure between said members, said film of friction material resulting from the circulation within the mechanism of friction material of a form capable of flowing between said relatively movable members, and means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

23. In mechanism, two members designed for relative movement, a film of friction material between said members, means to cause pressure between said members, said film resulting from the circulation within the mechanism of finely powdered friction material, and means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

24. In a shock absorber of the tubular type, an outer tubular structure, an inner piston structure, means for causing resistance to their relative movement, and means for connecting said structures respectively with the sprung and unsprung portions of a vehicle, said outer tubular structure being provided with a coiled member around its outer surface to protect it against damage by flying stones and gravel.

25. In a friction shock absorber, two relatively movable members adapted for connection respectively with the sprung and unsprung portions of a vehicle, means for causing pressure between said members, a member positioned between said members and slidable with relation to one of them, a quantity of friction material in finely powdered form confined within the shock absorber for circulating therewithin to form a film between the relatively slidable surfaces, and groove-like means so related to one of said relatively slidable surfaces that the free entry and maintenance of said friction material between all points of said surfaces is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

26. In a friction shock absorber, two relatively movable members adapted for connection respectively with the sprung and unsprung portions of a vehicle, means for causing pressure between said members, a quantity of friction material in finely powdered form confined within the shock absorber for circulating therewithin to form a film between said relatively movable members, and groove-like means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

27. In mechanism for controlling relative motion between the sprung and unsprung portions of a vehicle, a tubular structure adapted for connection with one of said vehicle portions, a longitudinally split tubular-like piston structure positioned therewithin and adapted for connection to said other vehicle portion and spaced from said first-mentioned tubular structure by friction material, a resilient member positioned within said longitudinally split piston structure, and means for compressing said resilient member axially to cause it to expand radially and to thus exert pressure against said longitudinally split piston structure and in turn cause pressure between said latter structure and said first-mentioned tubular structure, said means comprising a bolt, a washer and a nut, said nut being provided with internal faces for engagement by an adjusting tool having faces to mesh therewith.

28. In mechanism, the combination of two members designed for relative movement, means causing pressure between said members, friction material in powdered form within said mechanism, means for circulating said powdered material and causing it to enter between said relatively movable members and support them in spaced relation, and means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

29. In mechanism for controlling relative movements between the sprung and unsprung portions of a vehicle, two frictionally opposed members slidable longitudinally with relation to each other and adapted for connection respectively with said vehicle portions in such manner as to hold said members in a substantially horizontal position when the vehicle portions are in their normal standing relationship, and means to cause pressure between said opposed members, one of said members being provided with a tapered surface to vary said pressure means and produce a varying control resistance as the opposed members are caused to slide with relation to each other.

30. In a double-acting friction shock absorber, two coacting frictionally opposed members, means to cause pressure between them to effect frictional resistance to their relative movement, and means to cause greater pressure during their relative movements in one direction than in the opposite direction to cause a resistance differential between the two directions of movement, said resistance differential being unaffected by temperature changes.

31. In mechanism for controlling relative movements of the sprung and unsprung portions of a vehicle, a tapered structure, a coacting structure in frictional engagement therewith, said structures being arranged for pivotal connection respectively with said vehicle portions, the tapered form of said first-mentioned structure augmenting in producing, during one direction of relative movement of said vehicle portions, both an increasing and a decreasing resistance to said relative movement of said vehicle portions.

32. In mechanism, the combination of two members designed for relative pressure and movement, a film of friction material between said members, said film of friction material resulting from the circulation within the mechanism of friction material of a form capable of flowing between said relatively movable members, and means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

33. In a friction shock absorber, two relatively movable members adapted for connection respectively with the sprung and unsprung portions of a vehicle, means for causing pressure between said members, a quantity of friction material confined within the shock absorber for circulating therewithin to form a film between said relatively movable members, and means so related to one of said members that the free entry and maintenance of said friction material between all points of the working surfaces of said members is insured regardless of the pressure therebetween, said friction material possessing a sufficient balance between static and dynamic coefficients of friction to avoid objectionable spasmodic actions, vibrations and noises during relative movements of said members, said mechanism being provided with effective sealing means for the retention of said friction material and for the exclusion of matter foreign thereto.

34. In mechanism comprising two relatively movable structures, a portion of one of said structures being disposed within the other of said structures, a flexible telescopic boot structure attached at one of its ends to one of said first-mentioned structures and attached at its other end to the other of said first-mentioned structures, said boot structure having, between its ends, a greater cross section than at its ends.

35. In mechanism for controlling relative movements between the sprung and unsprung portions of a vehicle, a tapered tubular structure, a relatively movable and frictionally opposed piston structure, means for causing pressure between said structures, said structures being arranged for connection respectively with said vehicle portions, the tapered form of said tubular structure being such as to cause greater pressure between said structures when said vehicle portions are adjacent each other than when said vehicle portions are at their normal standing distance from each other.

JOHN WARREN WATSON.